United States Patent [19]

Aubriot

[11] Patent Number: 4,845,849
[45] Date of Patent: Jul. 11, 1989

[54] PIPE CUTTER WITH A GUIDED BLADE FOR PLASTIC PIPES CYLINDRICAL OR NOT

[75] Inventor: Claude Aubriot, Damery, France

[73] Assignee: Virax, Epernay, France

[21] Appl. No.: 157,787

[22] Filed: Feb. 19, 1988

[30] Foreign Application Priority Data

Feb. 19, 1987 [FR] France .................................. 87 02425

[51] Int. Cl.[4] .............................................. B23D 21/06
[52] U.S. Cl. .......................................... 30/92; 30/182; 30/241
[58] Field of Search ............. 30/92, 182, 185, 241-243

[56] References Cited

U.S. PATENT DOCUMENTS 1,156,745  10/1915  Brady ................................. 30/182 X
2,248,642   7/1941  Phillips ............................. 30/182 X

FOREIGN PATENT DOCUMENTS 277558  9/1927  United Kingdom .................. 30/241

Primary Examiner—Douglas D. Watts
Attorney, Agent, or Firm—Watson, Cole, Grindle & Watson

[57] ABSTRACT

A manual appliance for cutting pipes made of plastic, such as polyethylene, comprising a cutting blade mounted on a blade-holder moving under the action of a control screw between the two parallel branches of a guide saddle closed by means of a completely opening lower saddle.

9 Claims, 3 Drawing Sheets

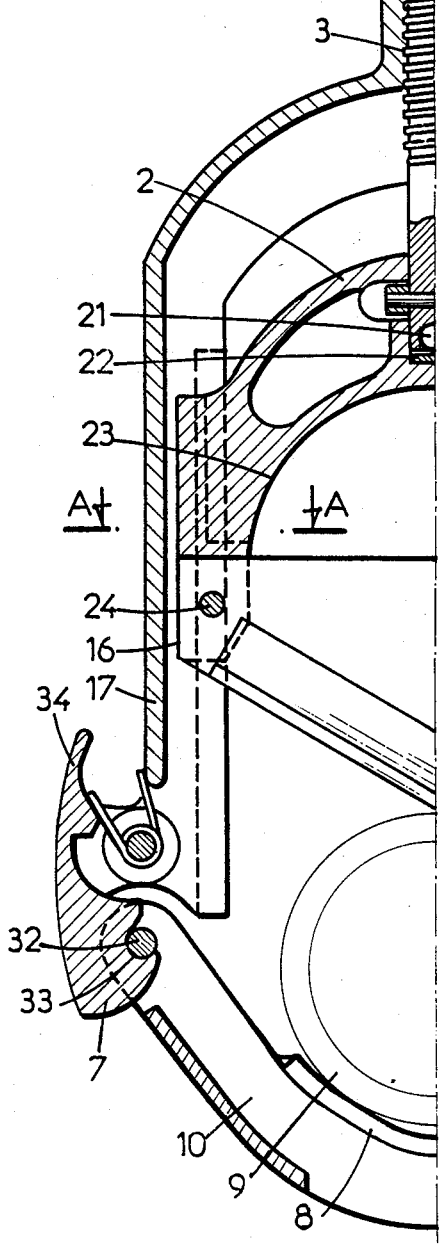
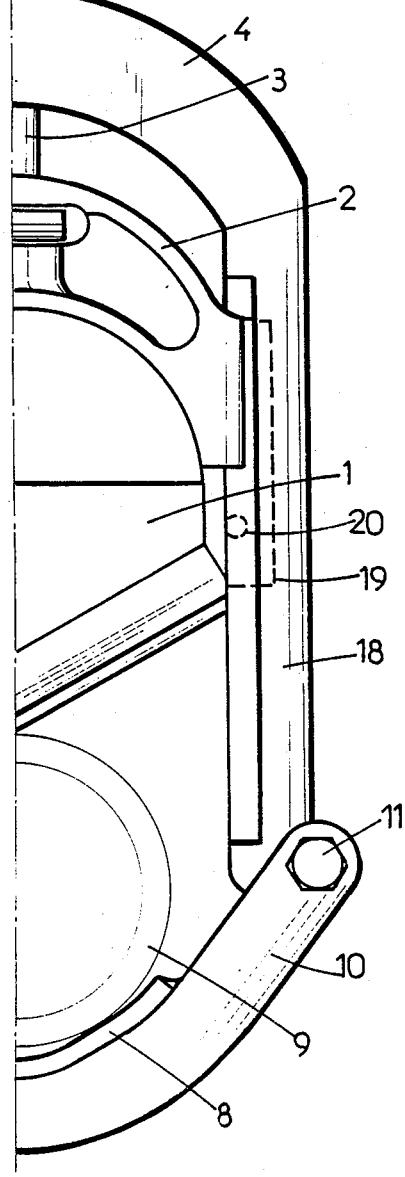
FIG.: 1A
FIG.: 1B

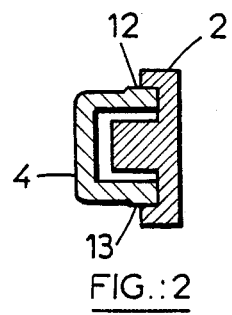
FIG.:2
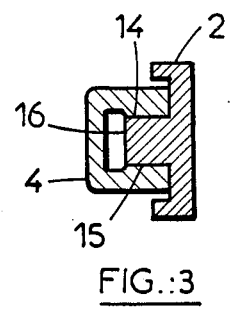
FIG.:3
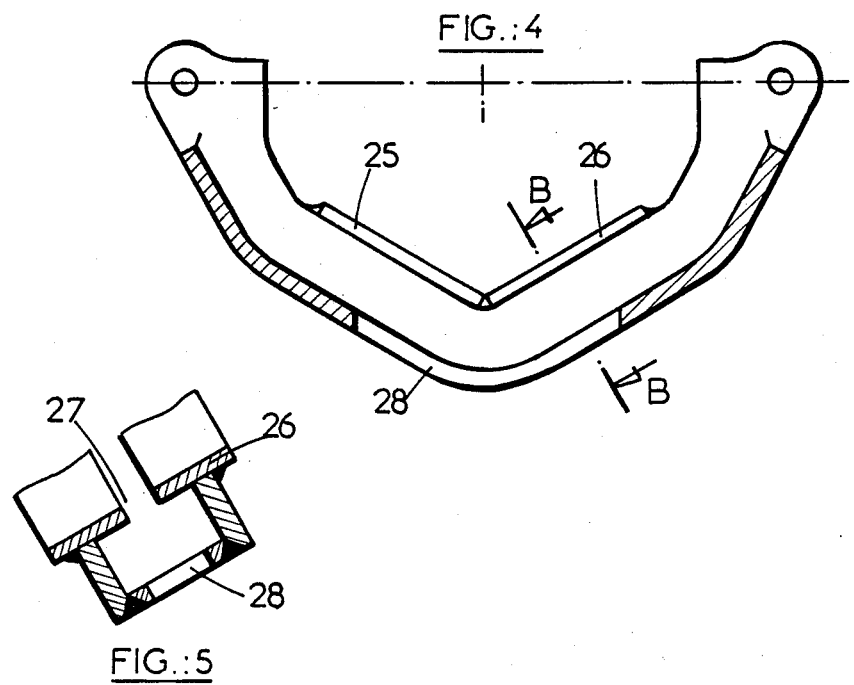
FIG.:4
FIG.:5

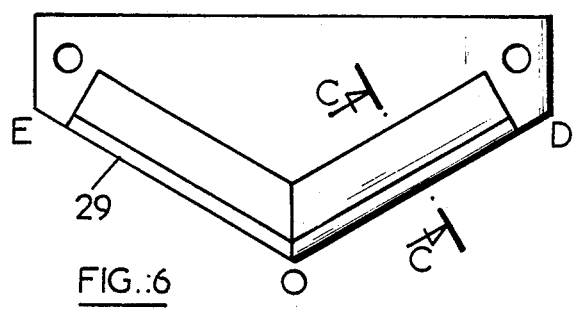
FIG.:6 FIG.:7
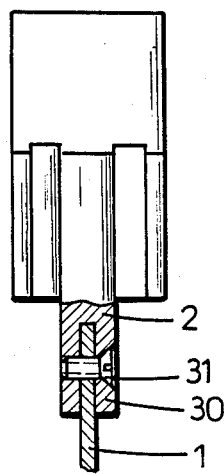
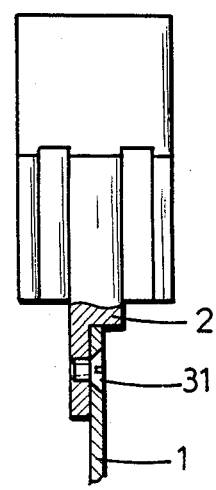
FIG.:8 FIG.:9

PIPE CUTTER WITH A GUIDED BLADE FOR PLASTIC PIPES CYLINDRICAL OR NOT

BACKGROUND OF THE INVENTION

The present invention relates to a manual appliance for cutting plastic pipes cylindrical or otherwise, of the type comprising a guide saddle closed by means of a completely opening lower saddle making it possible to take action on conduits in place as easily as on those being installed. Although there is no great difficulty in cutting plastic pipes in most common use at the present time, the same is not true of high-density polyethylene pipes which are supplied in the form of coils and which tend to be in more widespread use under the impetus of the Public Services in the following sectors: the transport of corrosive products, water supply, sewage disposal, the casing of defective conduits and gas distribution. These pipes are always ovalized to a great extent because of their method of delivery in the form of rings on reels, and as a result of their great thickness they have high rigidity. It is therefore virtually impossible to cut them on a wheel because with a wheel-type pipe cutter, whether it has a saddle or not, it is possible to cut only very slightly ovalized rigid pipes (such as steel pipes) or flexible pipes (such as those made of PVC) ovalized or otherwise and being subjected to deformation under the pressure of the wheel. A first solution has been proposed to solve this problem: this involves the use of shear-type bladed pipe cutters, but these, which are only heavy appliances resting on a base, still do not make it possible to work on the spot.

SUMMARY OF THE INVENTION

The object of the present invention is to provide a bladed pipe cutter which makes it possible to square-cut polyethylene pipes easily, whatever their ovalization, both in the workshop and on site, without the need for a bearing point, and which also allows a cut to be made without the removal of material and therefore without chips, and this can only be welcomed by the Technical Services of the distribution systems which appreciate not finding in the meters those chips which have fallen into the conduits, during maintenance work or work to modify the system.

Another object of the invention is to provide a pipe cutter which can be used in a very narrow trench, since the cut which is made without rotating the appliance about the pipe does not require any clearance.

SUMMARY OF THE INVENTION

The invention provides a pipe cutter comprising; a cutting blade mounted on a blade holder, a guide saddle having two parallel branches, the blade holder being slideable on these two parallel branches, a lower saddle mounted on the guide saddle by connection means which can be opened and closed to make it possible to place the pipe cutter astride a pipe to be severed, this pipe bearing on the lower saddle, a control screw designed to cause the blade holder to slide along the parallel branches of the guide saddle.

The small amount of space required underneath and on each side of the pipe which is achieved, according to the invention, as a result of the form of the lower saddle and the presence of the blade in the upper saddle makes it possible to reduce condiderably the volume of earth to be cleared under the pipe before work is carried out. Once the pipe cutter is in place on the pipe, the latter serving as a support, it only remains to tighten the control screw, using the actuating rod or a tee-handle socket wrench, in order to make the cut either from inside the trench or from outside.

BRIEF DESCRIPTION OF THE DRAWINGS

The invention is explained in detail below by means of drawings illustrating only one embodiment given as a nonlimiting example.

FIG. 1A shows an half longitudinal cross-section of a pipe cutter which is the subject of the invention, at the start of the cut and FIG. 1B shows an half front view, from the outside, of the same pipe cutter.

FIG. 2 shows the cross-section of the pipe cutter along the line A—A of FIG. 1A.

FIG. 3 shows an alternative form of FIG. 2.

FIG. 4 shows, in cross-section, another form of a lower saddle equipped with a pipe support consisting of plane metal plates.

FIG. 5 shows the cross-section of the lower saddle along the line B—B of FIG. 4.

FIG. 6 shows the blade of the pipe cutter.

FIG. 7 shows the cross-section along the line C—C of FIG. 6, at a different scale.

FIG. 8 shows the method of fastening the thin blade by pinching.

FIG. 9 shows another method of fastening the blade, adopted when a thick blade is used.

DETAILED DESCRIPTION OF THE PREFERRED EMBODIMENT OF THE INVENTION

Referring to FIG. 1, it will be seen that the blade (1) of this pipe cutter is mounted on a blade holder (2) which moves under the action of a control screw (3) between the two parallel branches of a guide saddle (4) closed by means of a lower saddle (10) held in place on one side by a pivot pin (11) and on the other side by a locking device (7), on which action can be taken to ensure that this saddle can pivot about its pivot pin until it is opened completely; this makes it possible to place the pipe cutter directly astride the pipe (9) to be severed. The control screw (3) is equipped with an actuating rod (5) and with a driving square (6) making it possible either to connect it to a motorization unit or to rotate it by means of a buried-pipe valve actuating wrench of the socket type used by the services of a distribution system. When the cutting blade engages the pipe (9) under the pressure of the screw (3), the bed of curbed cross-section (8) or of any other shape matching the profile of the pipe to be cut comes in contact with the pipe, against which it is laid, thus forcing the pipe cutter to sit square on the said pipe to be severed (9) which, clamped in this way, acts as a support for the pipe cutter for the entire duration of the cutting operation.

Still referring to FIG. 1, it can be seen that the upper part of the blade holder (2) receives the thrust of the control screw (3) by means of a stop or a steel ball (21) rotating on an insert (22), while the lower part has, between the two fastening points (24) (20) of the blade, a semicircular recess (23) of a diameter slightly greater than that of the largest pipe to be cut.

Referring to FIGS. 2 and 3, it will be seen that the blade-holder (2) can be guided between the two branches of the saddle (4) in two different ways: machined bearing surfaces are provided on the outer parts

(12) (13) of each branch, and these have to be in contact with the blade-holder so that it can slide on them (FIG. 2), or these bearing surfaces are provided on the inner parts (14 (15) of the same wings, so that the blade-holder can slide on the inside there. Whether the first method of guidance or its alternative form shown in FIG. 3 is adopted, the width of the cutting blade can be equal to that of the blade holder (2) located between its projecting parts (16), (19) moving between the wings of the two branches of the guide saddle (4) visible in FIG. 1. As a result of this, for a particular blade width, the space required by the guide saddle is greatly reduced.

For cutting large-diameter pipes delivered on reels, the thickness of the blade holder in the region of the recess (23) can be increased until it is equal to that of the bed (8) of the lower saddle, so that, at the end of the cut, its semicircular form surrounds the pipe under stress on each side of the blade sufficiently to prevent the violent springback of the severed sections which is generally very dangerous for the operator because the stresses which exist between the uncoiled part of the pipe and that remaining on the reel are high.

FIG. 4, together with the cross-section along the line B-B shown in FIG. 5, illustrates another form of a lower saddle, in which the bed of curved cross-section has been replaced by plane metal plates (25) (26) having, like the latter, an incision (27) arranged in the cutting plane of the blade, to allow the blade to complete its travel underneath the plates, thus ensuring that the pipe to be cut is severed completely. Since this incision (27) must always be free for the blade to pass through, a shorter and wider orifice (28) made along the same axis in the lowest part of the lower saddle prevents the dirt possibly present on the pipe to be cut from blocking the said incision by accumulating in the bottom of the saddle. Moreover, since this pipe cutter is a site appliance likely to be used in muddy places, this orifice (28) makes cleaning easier.

FIG. 6 shows a cutting blade, of which the vertex angle (OD, OE) is 120°, because if it is chosen between 100° and 150° this makes it possible to engage on the pipe without deformation. This angle of 120°, which is equal to that between the two plane metal plates (25), (26) of the lower saddle, makes it possible to sever the pipe completely with minimum elastic deformation and with minimum penetration of the blade into the incision (27). If the downward travel of the blade is limited to this slight penetration necessary for the cut, in this position the cutting edge (29) of the said blade is protected perfectly by the flanks of the lower saddle and the pipe cutter can be transported in complete safety in the state which it assumes once the cut has been completed.

Referring to FIG. 7, it will be seen that the cross-section of the cutting blade is symmetrical and that it has a slope discontinuity. This symmetry is necessary in order to obtain a perfectly square cut.

FIG. 8 shows the method of fastening by pinching which is used for so-called "thin" blades of small thickness. For this purpose, the lower ends of the blade holder (2) are equipped with straps (30), the elasticity of which is utilized to obtain the desired pinching of the blade simply as a result of the tightening of the screws (31).

FIG. 9 shows an alternative form of the fastening method which is easier to carry out, but which can be adopted only with the use of a thick blade which, although held on one side only, has a sufficient rigidity not to deviate from the cutting plane under the lateral forces encountered during normal use.

On public works sites, it must be possible to transport this type of pipe cutter from one place to another in complete safety. For this purpose, when the blade has been lowered completely into the recommended position for transport, the blade holder pushes the catching pin (32) of the lower saddle into the bottom of the groove (33) of the latch (7) visible in FIG. 1, and release making it possible to open the saddle simply by pressing on the upper part (34) of the latch (7) is thus impossible.

The cut is made quickly since it is sufficient to raise the blade by rotating the control screw (3) and to open the pipe cutter simply by pressing on the upper part of the latch (7), to make it possible to close it again on the pipe which is then severed as a result of the lowering of the blade under the action of the control screw which is then rotated in the opposite direction.

The grasping and the transport of the largest of these pipe cutters according to the invention can be improved by adding a bow-shaped handle which is fastened to the upper part of the guide saddle, thereby changing the aesthetic appearance, but not increasing the overall size and still making it possible to work in narrow trenches, the width of which need not exceed 2.5 times the diameter of the largest pipe accepted by the appliance.

This pipe cutter with a guided blade is therefore an appliance making it possible to cut quickly and in complete safety polyethylene pipes and most plastic pipes cylindrical or not which are difficult to cut with wheel-type pipe cutters. Its sector of use is the laying and maintenance of these pipes, in particular the water supply, the casing of defective conduits and the distribution of gas.

I claim:

1. A pipe cutter comprising:
   a guide saddle having two parallel branches,
   a lower saddle mounted on the guide saddle by connection means which can be opened and closed to make it possible to place the pipe cutter astride a pipe to be severed, the pipe bearing on the lower saddle,
   a blade holder which is slidable on the parallel branches of the guide saddle and is guided between said parallel branches by means of machined bearing surfaces arranged either on the outer parts of the branches or on the inner parts of said branches, these then having a U-shaped cross-section,
   a cutting blade mounted on said blade holder and having a cutting edge in a plane parallel to the direction of sliding of said blade holder, said cutting blade having, in said plane, a triangular shape with a middle cutting vertex with an angle between 100° and 150°,
   a control screw for causing said blade holder to slide along the parallel branches of the guide saddle.

2. A pipe cutter as claimed in claim 1, wherein the lower saddle comprises projecting plates extending on both sides of the plane of the cutting edge for supporting a tube to be cut, said projecting plates forming a re-entrant angle of substantially the same value as the angle of said vertex of the cutting blade.

3. A pipe cutter as claimed in claim 1, wherein the cutting blade is mounted on the blade holder by two fastening points.

4. A pipe cutter as claimed in claim 2, wherein the bottom of the lower saddle has a bed comprising metal plates separated by an incision into which the cutting blade can penetrate, and in its lowest part has an orifice which is shorter and wider than the incision and which is directed opposite to the blade.

5. A pipe cutter as claimed in claim 3, wherein the blade holder has, between the two fastening point of the blade, a semicircular recess of a diameter slightly greater than that of the largest pipe to be cut.

6. A pipe cutter as claimed in claim 2, wherein the blade holder and the lower saddle have projecting parts extending on opposite sides of the plane of the cutting blade over a distance sufficient to hold between them the two sections of a severed pipe.

7. A pipe cutter as claimed in claim 4, wherein the said projecting part of the blade holder is limited by the edge of a semicircular recess of a diameter slightly greater than that of the largest pipe to be cut.

8. A pipe cutter as claimed in claim 4, wherein the said projecting part of the lower saddle comprises metal plates separated by an incision between which the cutting blade can penetrate.

9. A pipe cutter as claimed in claim 1, wherein the bottom of the lower saddle has a bed comprising metal plates separated by an incision into which the cutting blade can penetrate, and in its lowest part has an orifice which is shorter and wider than the incision and which is directed opposite to the blade.

* * * * *